Patented Aug. 10, 1926.

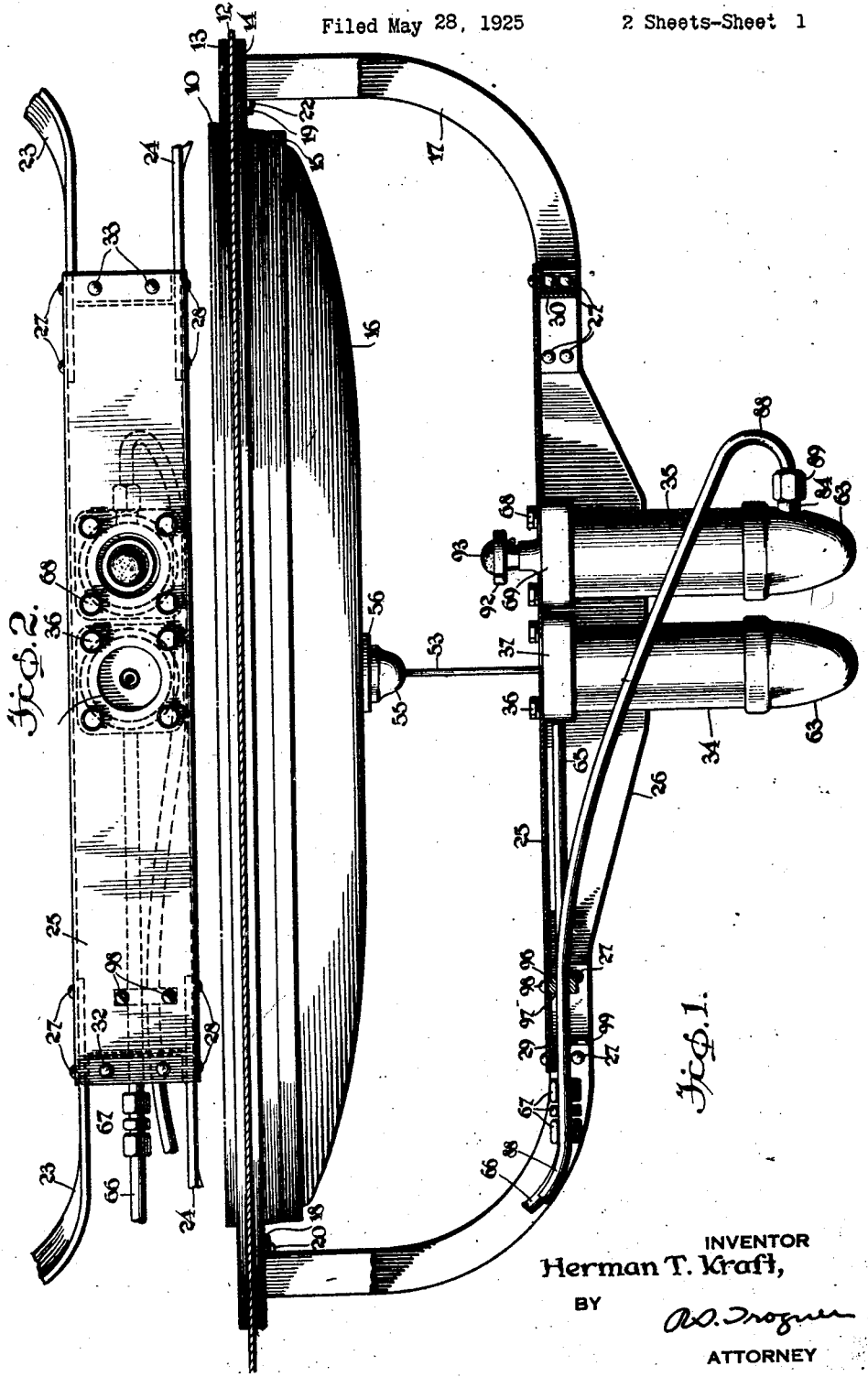

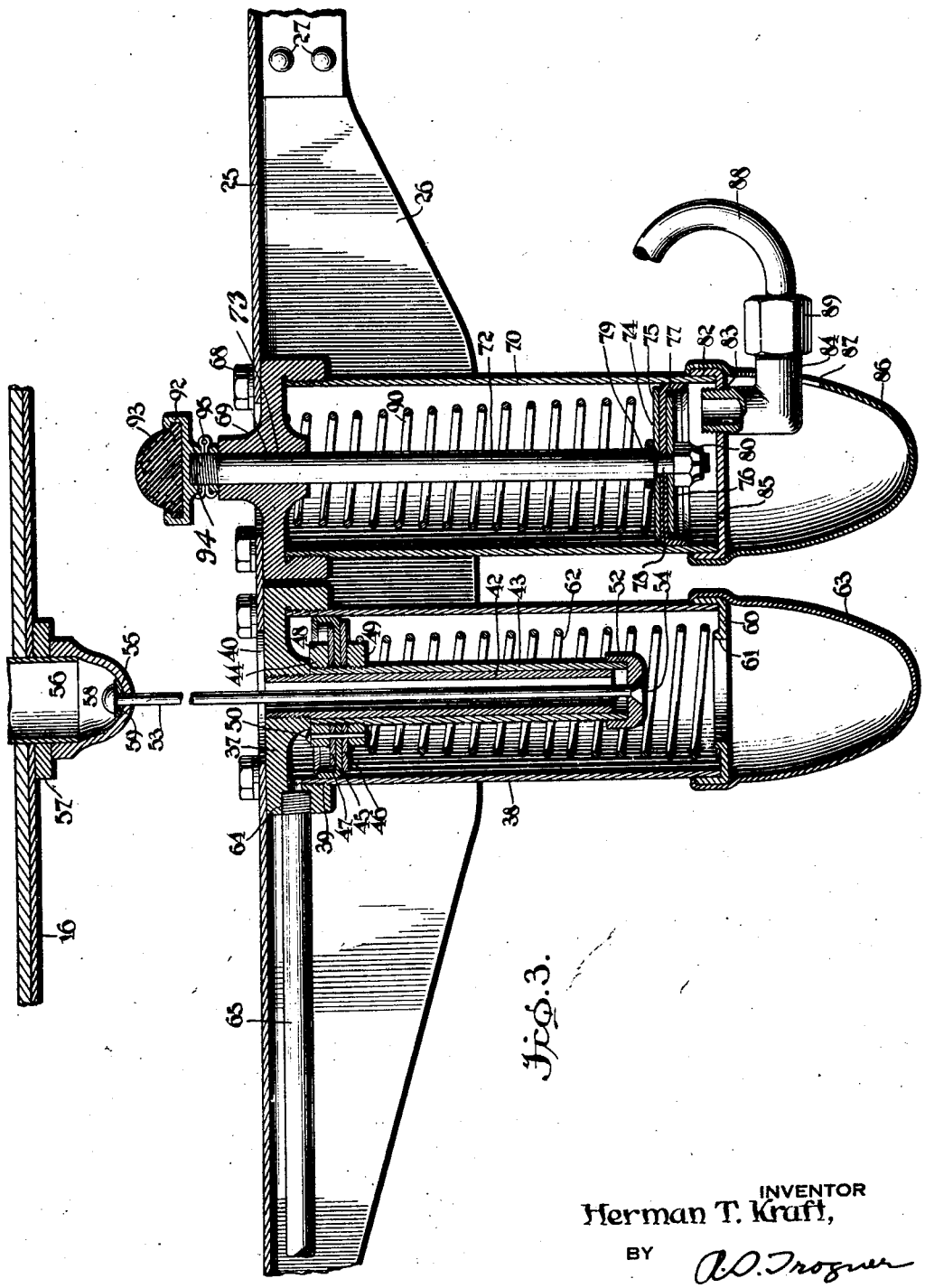

1,595,306

UNITED STATES PATENT OFFICE.

HERMAN T. KRAFT, OF AKRON, OHIO, ASSIGNOR TO THE GOODYEAR TIRE & RUBBER COMPANY, OF AKRON, OHIO, A CORPORATION OF OHIO.

PNEUMATIC VALVE-CONTROL MECHANISM.

Application filed May 28, 1925. Serial No. 33,472.

My invention relates to valves for aircraft and it has particular relation to an apparatus for controlling actuation of the movable parts of the valve.

The principal object of my invention is to provide a device which is simple of operation and which will effectively open or close a valve by the utilization of fluid pressure.

Another object of my invention is to provide an attachment for an aircraft valve which will insure tight fitting of the seating flanges of a valve gasket by incorporating in the attachment a fluid-pressure operating mechanism.

Another object of my invention is to provide a valve control device which is relatively simple and inexpensive and which is adapted to be attached to numerous types of valves employed in different types of aircraft.

In controlling navigation of aircraft, such as balloons or rigid, semi-rigid and non-rigid dirigibles, the efficiency with which they may be handled depends largely upon the operation of valves controlling escape of lifting gas from the envelope of the aircraft. There may be numerous valves, in case of very large airships, or there may be relatively few in case of the smaller airships or balloons. In any event the manner in which the manipulation of gas valves has heretofore been controlled in connection with aircraft of the above designated character, depends largely upon the manual operation of cables attached to the valves or by having some mechanical apparatus for reeling in the cables attached to operating parts of the valve, thus effecting the opening thereof. As commonly constructed, valves for controlling the flow of lifting gas are provided with resilient members which return the closing flanges of the valve gaskets to normal position, after a sufficient amount of gas has been permitted to escape.

In navigating large aircraft where there are a number of valves, the use of cables attached to the valves involves handling an intricate assortment of movable ends of cables and there is a possibility of the cables becoming entangled with each other, thereby causing danger, especially under unfavorable conditions of navigation. There is also a possibility of the seating flanges of the closing members of the valve becoming out of alinement, in which case only the resilient members which return the valve parts to normal position, operate to insure proper closure of the valve.

I have devised an apparatus or attachment which is adapted to obviate the above mentioned disadvantages and which is adapted to be secured to a part of a valve structure. The apparatus includes a pneumatically operated closing and opening mechanism which eliminates the necessity of the utilization of cables. When a device embodying my invention is installed, it is necessary only to press a button and the valve is operated mechanically. In case my apparatus is installed in connection with the well known automatic aircraft valve, the operation of the latter is not in any way interfered with. It is equally well adapted for attachment to various types of valves common to the art.

In general, an apparatus embodying my invention includes a frame or yoke adapted to be secured to the peripheral flanges of a conventional type of valve. This yoke extends in spaced relationship below the dome of the valve. The operating mechanism which is adapted to control movement of the valve dome is secured centrally of the yoke immediately below the dome and includes a plurality of fluid pressure cylinders which are operatively connected to the dome of the valve for closing and opening the latter. These cylinders are each supplied with compressed fluid through the medium of suitable tubes which communicate with the power or observation car. The admission of fluid to the tubes is under control of the pilot by means of buttons or like instrumentalities which may be manipulated at will. Each of the cylinders is provided with a separate control button connected to its respective fluid supply tube.

For a more thorough understanding of my invention, reference may now be had to the accompanying drawings forming a part of this specification of which;

Fig. 1 is an elevational view of my pneumatic control apparatus, parts thereof being broken away;

Fig. 2 is a fragmentary plan view of the apparatus; and

Fig. 3 is a fragmentary cross-sectional view, on a larger scale, illustrating in detail the operating parts of the apparatus.

In practising my invention, I have so constructed apparatus embodying the principles thereof that it is adapted to be connected to any of various types of aircraft valves, an example of which is illustrated in the drawings. A valve 10 is connected in the usual manner to an aircraft having embodied therein, a lifting gas container in the form of a fabric envelope 12 providing a gas tight closure between flanges 13 and 14 of the valve. Immediately adjacent the flanges of the valve, a gasket 15 is provided which is constructed in a conventional manner and upon which the closing surface of a dome 16 is adapted to rest. As a general rule, the valve is provided with resilient elements which tend to maintain the dome and gasket in close contacting relationship until the valve is opened mechanically, or in case of the automatic valve, until a pre-determined amount of pressure is generated within the envelope of the aircraft by expansion of the gas contained therein. As the resilient mechanism is not a part of this invention, it is not believed to be necessary to include an illustration thereof in the drawing.

In mounting my novel apparatus upon the valve, I have provided a yoke or frame member 17, extending beneath the dome of the valve and having flanges 18 and 19 adapted to be secured to the flanges of the valve by means of conventional screws or rivets 20 and 22. As illustrated in Figs. 1 and 2, the yoke member is composed of relatively thin metal bars 23 and 24 which diverge toward their outer ends in order to provide proper bracing for the yoke member. An intermediate part of the yoke includes a plate 25 having reinforcing side flanges 26, each of which is connected at each end to the bars 23 and 24 by means of rivets 27 and 28, or other suitable devices. The plate is provided at one end with a reinforcing cross piece 29 and at the other end with a similar cross piece 30, these cross pieces being riveted within the channel formed by the flanges of the plate, as indicated at 32 and 33 respectively.

The operating parts of my valve control mechanism primarily comprise a valve opening cylinder 34 adapted to receive fluid under pressure, and a valve closing cylinder 35, also adapted to receive fluid under pressure. The cylinder 34 is secured to the plate by means of bolts and nuts 36 extending into an upper head member 37 of the cylinder, the body portion 38 of the cylinder being threaded into the head member, as indicated at 39. It will be noted by reference to Fig. 3 that the cylinder 34 is secured immediately below an opening 40 in the plate. A tube 42 is threaded into the head member centrally thereof and is enclosed by a second tube member 43 slidably mounted thereon and upon the upper end of which a piston head 44 is secured.

The piston head 44 is composed of two washers 45 and 46 between which a leather cup 47 is disposed, two nuts 48 and 49 being positioned at the outer sides of the washers and screwed tightly against the opposite sides of the latter. The assembled parts of the piston head are maintained in place by means of a rivet or pin 50 extending therethrough. At the lower end of the outer tube 43, a cap member 52, forming a closure for the tube, is secured in any conventional manner, and a rod or cable 53 is connected to the cap by means of a flared enlarged portion 54 fitting within a complementary portion of the cap. The rod extends upwardly through the tube 42 and through the opening 40 in the plate, the rod being slidably secured at its upper end to a cap member 55 welded or otherwise suitably secured to a cylindrical member 56 extending from the central portion of the dome 16 of the valve. Tight fitting of these parts is insured by a washer 57 placed about the cylinder 56 and against which the cap member abuts. The upper end of the rod is provided with an enlarged head 58 which rests upon a cushion member 59 in the lower part of the cap member 55.

At the lower end of the cylinder body 38 I have provided a cap member 60 having an opening 61 therein. This cap member serves as a support upon which the lower end of a coil spring 62 rests, the upper end of the coil spring engaging the lower surface of the piston head 44. A dome shaped closure member 63 is secured over the lower cap of the cylinder body 38 and provides space into which the lower end of the outer tube may descend when the piston head is moved downwardly. At the upper end of the cylinder, I have provided an opening 64 in the member 37 into which a section 65 of flexible tubing 66 made of any suitable metal, such as copper, is threaded, and the usual connecting joint members 67 are provided for the section 65 in order that the latter may be conveniently screwed into the opening 64 before it is connected to the main portion of the tube.

It will be seen from this construction that admission of fluid under pressure through the tube will move the piston head 44 downwardly together with the outer tube member 43 and consequently the dome 16 will be actuated downwardly to open the valve. When the valve has been opened sufficiently and the desired amount of gas released, the flow of compressed fluid through the tube 65 is discontinued. The spring 62 will then return the piston head 44 to normal position. In case the dome of the valve does not close as rapidly as the spring 62 returns the piston head to normal position, undesirable buckling tendency of the rod 53 is prevented because of the fact that the shank of the rod 53 is permitted to slide through the upper cap member 55. It is obvious from Fig. 3 that the lower end of the rod may also be made slidable through the cap 52 and thus prevent buckling of the rod in substantially the same manner as above described.

In order to insure absolute closing of the valve 10, the cylinder 35, which I have designate as the valve-closing cylinder, is connected adjacent the cylinder 34 to the plate 25 by means of nuts and bolts 68 secured to a head member 69, similar to the member 37 above described. A container 70 is screwed into the head member. In this case, the inner tubular members are dispensed with and a piston rod 72 extends through an opening 73 in the head member and is provided at its lower end with a piston head 74 composed of two metal washers 75 and 76 clamping between them a leather cup washer 77. These washers are fitted upon a reduced end portion 78 of the piston rod and abut against a shoulder thereof, as indicated at 79, a nut 80 being employed to hold the washers rigidly together.

Adjacent the lower end of the cylinder, a cap member 82 is secured and is provided with a threaded opening 83 into which a hollow angle joint member 84 is screwed. A relatively small opennig 85 is also formed in the cap member which permits escape of air which may be entrapped in the cylinder below the piston. A dome shaped member 86, of the same shape as the one at the lower end of the cylinder 34 previously described, is secured over the cap member 82 of the cylinder and is provided with an opening 87 through which the joint member 84 extends. A hollow tube 88 of copper or other suitable metal is secured to the angle member by means of a nut 89 and communicates with the source of fluid under pressure. In order to maintain the piston head 74 in normal position, as illustrated in Fig. 3, a coil spring 90 is disposed within the cylinder, resting at its lower end against the piston head and at its upper end engaging the head member 69 of the cylinder.

For the purpose of eliminating undesirable noises and of reducing wear upon engaging parts of the device, I have provided a cup member 92, having a rubber bumper member 93 disposed therein, screwed upon the upper end of the piston rod, as indicated at 94, the cup member being prevented from turning by means of a cotter pin 95 extending through the rod and cup member 92.

By admission of fluid under pressure through the pipe into the lower portion of the cylinder, the piston is raised and the buffer 93 engages the lower part of the dome and presses the closing members of the valve tightly together. As soon as the air pressure is relieved, the spring will return the piston to normal position, as illustrated in Fig. 3 and the fluid entrapped in the lower part of the cylinder 70 is allowed to escape slowly through the small opening 85.

In order to provide a support for the fluid pressure tube members, I have designed a bracket 96 which is formed with an opening 97 therein through which the tubes extend, the bracket being secured to the plate member by means of screws 98. The tubes also extend through a notch 99 provided in the reinforcing cross piece 29. The tubes conveying fluid under pressure to the cylinders being flexible, they may be so trained along the structural elements of the aircraft as to be hidden from view, thereby eliminating any unsightly appearances, as well as being protected from damage which might occur in case of excessive vibration or other members coming into contact therewith.

It will be seen from the above description that I have provided a valve operating mechanism which is very simple of operation and which efficiently closes or opens the valve at any time desired. Since the structure of the device is comparatively simple and as the operation is obvious from the above description, a detailed discussion of the latter is not deemed to be necessary.

Although I have illustrated but one form which my invention may assume and have described in detail but a single application thereof, it will be apparent to those skilled in the art that it is not so limited but that various minor modifications and changes may be made therein without departing from the spirit of my invention or from the scope of the appended claims.

What I claim is:

1. A control apparatus for a valve having a dome, comprising a member spaced from the dome and secured to the valve and a cylinder carried by the member provided with pneumatically operated means for actuating the valve dome.

2. A control apparatus for a valve having a dome comprising a member secured adjacent the dome and a cylinder provided with pneumatically operated means connected to the member and dome for opening the valve.

3. A control apparatus for an aircraft valve comprising a member secured to the valve, a cylinder secured to the member provided with means for opening the valve and means operatively associated with the member adapted to close the valve.

4. A control apparatus for an aircraft valve comprising a member secured to the valve, a cylinder secured to the member provided with means for opening the valve and pneumatically operated means adapted to close the valve.

5. A control apparatus for an aircraft valve comprising a member secured to the valve, a cylinder provided with pneumatically operated means for opening the valve, and a second cylinder provided with pneumatically operated means connected to the member being adapted to close the valve.

6. A control apparatus for an aircraft valve comprising a member secured thereto extending in spaced relationship beneath the valve, a cylinder carried by the member having a pneumatically operated piston therein operatively connected to the valve, and a spring in the cylinder adapted to return the piston to normal position after it has been operated.

7. A control apparatus for an aircraft valve comprising a member secured thereto extending in spaced relationship beneath the valve, a cylinder having a pneumatically operated piston therein operatively connected to the member and to the valve for opening the latter, a spring within the cylinder, and a second cylinder provided with a spring pressed pneumatically operated piston adapted to close the valve.

8. A control apparatus for an aircraft valve having a dome comprising a member secured to the valve, a cylinder secured to the member, a pneumatically operated buffer mechanism adapted to engage the dome to insure closure of the latter.

9. A control apparatus for an aircraft valve having a dome comprising a member secured to the valve, a cylinder secured to the member, a pneumatically operated piston mechanism provided with a resilient bumper adapted to engage the dome to insure closure of the valve.

10. The combination with an aircraft valve, of a frame carried by the valve and a plurality of pneumatically operated members secured to the frame and adapted to open and close the valve.

11. The combination with an aircraft valve having a dome, of a yoke member secured to the valve and two cylinders secured to the yoke provided with pneumatically operated mechanisms adapted to respectively open and close the valve.

12. The combination with an aircraft valve having a dome of a member secured to the valve, a cylinder secured to the member provided with a pneumatically operated mechanism connected to the dome for opening the valve and a second cylinder secured to the member provided with pneumatically operated means adapted to engage the dome and close the valve.

In witness whereof, I have hereunto signed my name.

HERMAN T. KRAFT.